(12) United States Patent
Heo et al.

(10) Patent No.: US 12,199,322 B2
(45) Date of Patent: Jan. 14, 2025

(54) APPARATUS AND METHOD FOR POWER SUPPLY USING COOPERATION OF FUEL CELL AND ENERGY STORAGE

(71) Applicant: ELECTRONICS AND TELECOMMUNICATIONS RESEARCH INSTITUTE, Daejeon (KR)

(72) Inventors: Sewan Heo, Daejeon (KR); Tai-yeon Ku, Daejeon (KR); Wan Ki Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 47 days.

(21) Appl. No.: 18/074,602

(22) Filed: Dec. 5, 2022

(65) Prior Publication Data

US 2023/0178771 A1 Jun. 8, 2023

(30) Foreign Application Priority Data

Dec. 7, 2021 (KR) .................. 10-2021-0173811
Aug. 12, 2022 (KR) .................. 10-2022-0101555

(51) Int. Cl.
*H01M 8/04664* (2016.01)
*H01M 8/0432* (2016.01)
(Continued)

(52) U.S. Cl.
CPC ..... *H01M 8/04671* (2013.01); *H01M 8/0432* (2013.01); *H01M 8/04626* (2013.01);
(Continued)

(58) Field of Classification Search
CPC ......... H01M 8/04671; H01M 8/04626; H01M 8/04932; H01M 10/44; H01M 16/006; H02J 7/0048; H02J 7/0063; H02J 2300/30
See application file for complete search history.

(56) References Cited

U.S. PATENT DOCUMENTS

2003/0184256 A1* 10/2003 Kopf ..................... H01M 10/44
320/101
2013/0218356 A1 8/2013 Lee et al.
(Continued)

FOREIGN PATENT DOCUMENTS

KR 10-1233504 B1 2/2013
KR 10-2013-0091844 A 8/2013
(Continued)

*Primary Examiner* — Jared Fureman
*Assistant Examiner* — Duc M Pham
(74) *Attorney, Agent, or Firm* — LRK PATENT LAW FIRM

(57) ABSTRACT

A power supply apparatus according to an example embodiment includes an abnormal state determiner configured to determine a maximum output of a fuel cell by determining whether there is an abnormality in the fuel cell, a fuel cell controller configured to control output power of the fuel cell within the maximum output based on demand power of a load, an energy storage configured to charge with power by receiving the power from the fuel cell and supply the power to the load, a charging state determiner configured to determine a charging state of the energy storage based on a charging amount of the energy storage, and a storage controller configured to control charging and discharging of the energy storage based on a difference between the demand power of the load and the output power of the fuel cell.

20 Claims, 7 Drawing Sheets

(51) Int. Cl.
     *H01M 8/04537*   (2016.01)
     *H01M 8/04701*   (2016.01)
     *H01M 8/04858*   (2016.01)
     *H01M 8/04955*   (2016.01)
     *H01M 10/44*   (2006.01)
     *H01M 10/48*   (2006.01)
     *H01M 16/00*   (2006.01)
     *H02J 7/00*   (2006.01)

(52) U.S. Cl.
     CPC ... *H01M 8/04701* (2013.01); *H01M 8/04932* (2013.01); *H01M 8/04955* (2013.01); *H01M 10/44* (2013.01); *H01M 10/48* (2013.01); *H01M 16/006* (2013.01); *H02J 7/0048* (2020.01); *H02J 7/0063* (2013.01); *H02J 7/00712* (2020.01); *H02J 2300/30* (2020.01)

(56) References Cited

U.S. PATENT DOCUMENTS

| | | | |
|---|---|---|---|
| 2019/0255969 A1 | 8/2019 | Takamoto et al. | |
| 2020/0391615 A1* | 12/2020 | Beck | H01M 16/006 |
| 2022/0123335 A1* | 4/2022 | Fujimura | H01M 8/04089 |
| 2023/0107318 A1* | 4/2023 | Lane | H02J 7/34 |
| | | | 307/9.1 |

FOREIGN PATENT DOCUMENTS

| | | |
|---|---|---|
| KR | 10-2019-0024278 A | 3/2019 |
| KR | 10-2086352 B1 | 3/2020 |

* cited by examiner

APPARATUS AND METHOD FOR POWER SUPPLY USING COOPERATION OF FUEL CELL AND ENERGY STORAGE

CROSS-REFERENCE TO RELATED APPLICATIONS

This application claims the benefit of Korean Patent Application No. 10-2021-0173811 filed on Dec. 7, 2021, and Korean Patent Application No. 10-2022-0101555 filed on Aug. 12, 2022, in the Korean Intellectual Property Office, the entire disclosure of which is incorporated herein by reference for all purposes.

BACKGROUND

1. Field of the Invention

One or more example embodiments relate to power supply technology using cooperation of a fuel cell and an energy storage.

2. Description of Related Art

A fuel cell is a power generation device that generates electricity by using fuel, such as hydrogen, and is an alternative energy source classified as new energy since the fuel cell uses eco-friendly fuel, thus producing less carbon. Unlike renewable energy, such as solar power, the fuel cell is not affected by the environment and may control the intensity of an output by adjusting the amount of fuel used.

An energy storage is a device configured to charge or discharge electrical energy and may supply and consume power and be a resource used for various purposes since an output of the energy storage may be simply controlled. The energy storage may not directly generate power. Power may be used only within the amount of energy charged in the energy storage.

Cooperation of the fuel cell with the energy storage may facilitate a flexible response to change in power demand of a load.

SUMMARY

According to an aspect, there is provided a power supply apparatus including a fuel cell configured to generate power, using fuel, an abnormal state determiner configured to determine a maximum output of the fuel cell by determining whether there is an abnormality in the fuel cell, a fuel cell controller configured to control output power of the fuel cell within the maximum output based on demand power of a load, an energy storage configured to charge with power by receiving the power from the fuel cell and supply the power to the load, a charging state determiner configured to determine a charging state of the energy storage based on a charging amount of the energy storage, and a storage controller configured to control charging and discharging of the energy storage based on a difference between the demand power of the load and the output power of the fuel cell.

The fuel cell controller may be configured to determine an output of the fuel cell to be equal to the demand power of the load, where the charging state of the energy storage is a normal state.

The fuel cell controller may be configured to determine an output of the fuel cell to be less than the demand power of the load, where the charging state of the energy storage is a high charging state.

The fuel cell controller may be configured to determine an output of the fuel cell to be greater than the demand power of the load, where the charging state of the energy storage is in a low charging state.

The storage controller may be configured to determine output power required, based on a difference between the demand power of the load and the output power of the fuel cell, control the energy storage to discharge a same power as the output power required within a maximum output of the energy storage, where the demand power of the load is greater than the output power of the fuel cell and the charging amount is greater than a set minimum charging amount, and control the energy storage to charge with a same power as the output power required within the maximum output of the energy storage, where the demand power of the load is less than the output power of the fuel cell and the charging amount is less than a set maximum charging amount.

The storage controller may be configured to discontinue discharging the energy storage, where the demand power of the load is greater than the output power of the fuel cell and the charging amount is less than the set minimum charging amount, and discontinue charging the energy storage, where the demand power of the load is less than the output power of the fuel cell and the charging amount is greater than the set maximum charging amount.

The abnormal state determiner may be configured to determine whether the fuel cell is overheated and, where overheated, reduce the maximum output of the fuel cell such that a temperature of the fuel cell is maintained at a maximum temperature or below.

The abnormal state determiner may be configured to determine whether the fuel cell is low on fuel, and, where the fuel cell is low on fuel, reduce the maximum output of the fuel cell such that the fuel cell is operative for a set time.

The abnormal state determiner may be configured to determine whether a failure occurs in the fuel cell and, where the failure occurs, discontinue an operation of the fuel cell.

The abnormal state determiner may determine whether there is an instruction from an operator to limit an output, and when there is the instruction to limit the output, reduce the maximum output of the fuel cell according to the instruction to limit the output.

According to an aspect, there is provided a method of supplying power including generating power, using a fuel cell, determining a maximum output of the fuel cell by determining whether there is an abnormality in the fuel cell, controlling output power of the fuel cell within the maximum output, based on demand power of a load, determining a charging state of an energy storage based on a charging amount of the energy storage configured to be charged by receiving power from the fuel cell and supply power to the load, and controlling charging and discharging of the energy storage based on a difference between the demand power of the load and the output power of the fuel cell.

The controlling of the output power of the fuel cell may include determining an output of the fuel cell to be equal to the demand power of the load, where the charging state of the energy storage is a normal state.

The controlling of the output power of the fuel cell may include determining an output of the fuel cell to be less than the demand power of the load, where the charging state of the energy storage is a high charging state.

The controlling of the output power of the fuel cell may include determining an output of the fuel cell to be greater than the demand power of the load, where the charging state of the energy storage is a low charging state.

The controlling of the charging and the discharging of the energy storage may include determining output power required, based on a difference between the demand power of the load and the output power of the fuel cell, controlling the energy storage to discharge a same power as the output power required within a maximum output of the energy storage, where the demand power of the load is greater than the output power of the fuel cell and the charging amount is greater than a set minimum charging amount, and controlling the energy storage to charge with a same power as the output power required within the maximum output of the energy storage, where the demand power of the load is less than the output power of the fuel cell and the charging amount is less than a set maximum charging amount.

The controlling of the charging and the discharging of the energy storage may further include discontinuing discharging of the energy storage, where the demand power of the load is greater than the output power of the fuel cell and the charging amount is less than the set minimum charging amount and discontinuing charging of the energy storage, where the demand power of the load is less than the output power of the fuel cell and the charging amount is greater than the set maximum charging amount.

The determining of the maximum output of the fuel cell may include determining whether the fuel cell is overheated, and, where the fuel cell is overheated, reducing the maximum output of the fuel cell so that a temperature of the fuel cell may be maintained at a maximum temperature of the fuel cell or below.

The determining of the maximum output of the fuel cell may include determining whether the fuel cell is low on fuel and, where the fuel cell is low on fuel, reducing the maximum output of the fuel cell to operate the fuel cell for a set time.

The determining of the maximum output of the fuel cell may include determining whether a failure occurs in the fuel cell and, where the failure occurs, discontinuing an operation of the fuel cell.

The determining of the maximum output of the fuel cell may include determining whether there is an instruction from an operator to limit an output and, where there is the instruction to limit the output, reducing the maximum output of the fuel cell according to the instruction to limit the output.

Additional aspects of example embodiments will be set forth in part in the description which follows and, in part, will be apparent from the description, or may be learned by practice of the disclosure.

According to example embodiments, even when a power demand of a load skyrockets beyond the maximum output of a fuel cell or an abnormality occurs in the fuel cell, power may be stably supplied to the load in cooperation with an energy storage.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
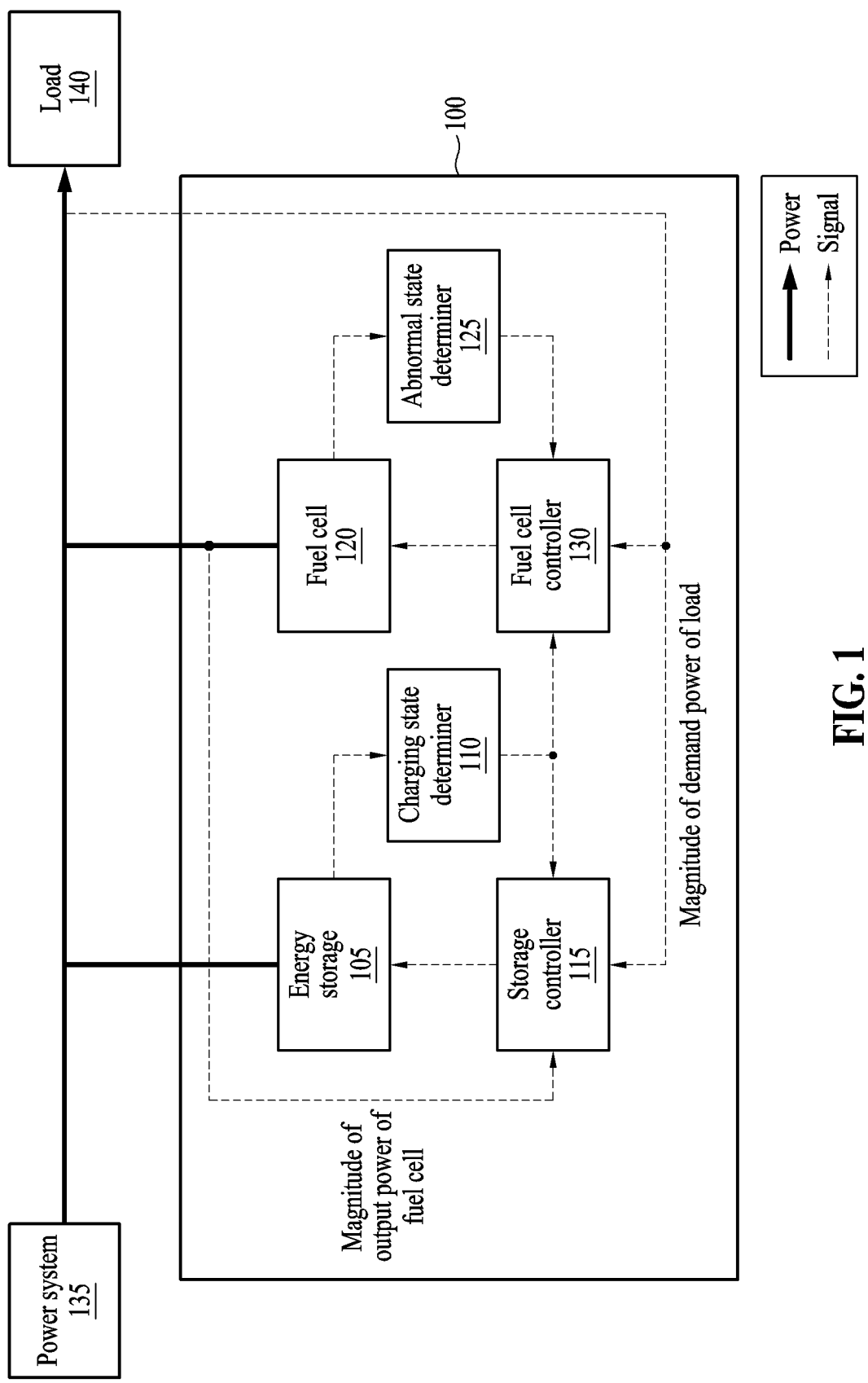
FIG. 1 is a diagram illustrating a configuration of a power supply apparatus according to an example embodiment.

Hereinafter, example embodiments will be described in detail with reference to the accompanying drawings. However, various alterations and modifications may be made to the example embodiments. Here, the example embodiments are not meant to be limited by the descriptions of the present disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

FIG. 1 illustrates a configuration of a power supply apparatus according to an example embodiment.

Referring to FIG. 1, a power supply apparatus 100 according to an example embodiment may include a fuel cell 120 configured to generate power using fuel and supply power to a load 140, an abnormal state determiner 125 configured to determine an abnormality of the fuel cell 120, a fuel cell controller 130 configured to control output power of the fuel cell 120, an energy storage 105 configured to charge with power by receiving the power from the fuel cell 120 and provide power to the load 140, a charging state determiner 110 configured to determine a charging state of the energy storage 105 based on a charging amount of the energy storage, and a storage controller 115 configured to control charging and discharging of the energy storage 105 based on a difference between demand power of the load 140 and output power of the fuel cell 120. The fuel cell controller 130 and the storage controller 115 may not operate independently but may operate in cooperation with each other. In an example embodiment, operations of the abnormal state determiner 125, the fuel cell controller 130, the charging state determiner 110, and the storage controller 115 may be performed by a processor (not shown).

The fuel cell 120 may output the same power as demand power of the load 140, based on the demand power of the load 140. In an example embodiment, where demand power of the load 140 is greater than an output of the fuel cell 120, the amount of insufficient power may be supplied by the energy storage 105 or a power system 135. Conversely, where demand power of the load 140 is less than output power of the fuel cell 120, the amount of surplus power may be transferred to the energy storage 105 or the power system 135. In another example embodiment, the power supply apparatus 100 and the load 140 may not be connected to the power system 135.

The energy storage 105 may support the fuel cell 120 in supplying power to the load 140. The discharging power of the energy storage 105 may be added to the output power of the fuel cell 120 and transmitted to the load 140. The charging power of the energy storage 105 may reduce the amount of output power of the fuel cell 120 transmitted to the load 140.

In an example embodiment, where the sum of the output power of the fuel cell 120 and the output power of the energy storage 105 is equal to the demand power of the load 140, no power may be supplied by or transmitted to the power system 135. Where the sum of the output power of the fuel cell 120 and the output power of the energy storage 105 is not equal to the demand power of the load 140, the amount of insufficient power may be supplied by the power system 135 or the amount of surplus power may be transferred to the power system 135.

The abnormal state determiner 125 may determine whether an abnormality occurs in the fuel cell 120 and may adjust the maximum output of the fuel cell 120 according to occurrence of the abnormality. Where there is no abnormality in the fuel cell 120, the maximum output of the fuel cell 120 may be determined to be an output value corresponding to a capacity of the fuel cell 120, and where there is an abnormality in the fuel cell 120, the maximum output of the fuel cell 120 may be reduced or an operation of the fuel cell 120 may be discontinued according to the type of abnormality.

The fuel cell controller 130 may control the output of the fuel cell 120 by adjusting the amount of fuel supplied to the fuel cell 120. Where the charging state of the energy storage 105, determined by the charging state determiner 110, is a normal state, the fuel cell controller 130 may set the output of the fuel cell 120 to be the same as the demand power of the load 140, so that all of the output of the fuel cell 120 may be supplied to the load 140. Where the charging state of the energy storage 105 is a high charging state, the fuel cell controller 130 may control the output of the fuel cell 120 to be less than the demand power of the load 140. By controlling the output of the fuel cell 120 to be less than the demand power of the load 140, the amount of insufficient power may be induced to be supplied by the energy storage 105. Where the charging state of the energy storage 105 is a low charging state, the fuel cell controller 130 may control the output of the fuel cell 120 to be greater than the demand power of the load 140. By controlling the output of the fuel cell 120 to be greater than the demand power of the load 140, the amount of surplus power after being supplied to the load 140 may be transferred to the energy storage 105 to charge the energy storage 105.

The fuel cell controller 130 may control the fuel cell 120 to generate the output of the fuel cell 120 within the maximum output determined by the abnormal state determiner 125.

The charging state determiner 110 may determine a charging state of the energy storage 105 to be any one of a high charging state, a normal state, and a low charging state, based on the charging amount of the energy storage 105. The charging state of the energy storage 105 may be transferred to the storage controller 115. The charging state of the energy storage 105 is described below with reference to FIG. 7.

The storage controller 115 may induce discharging of the energy storage 105 in the high charging state and limit charging of the energy storage 105 So as not to exceed a set maximum charging amount. The storage controller 115 may induce charging of the energy storage 105 in the low charging state and limit discharging of the energy storage 105 so as not to exceed a set minimum charging amount. The storage controller 115 may not limit the charging and discharging of the energy storage 105 in the normal state.

The storage controller 115 may control the charging or discharging of the energy storage 105 by as much as a difference between the demand power of the load 140 and the output power of the fuel cell 120. Where the demand power of the load 140 is greater than the output power of the fuel cell 120 so power is insufficient, the storage controller 115 may cause the energy storage 105 to discharge the same amount as the amount of the insufficient power to supply power to the load 140. Where the demand power of the load 140 is less than the output power of the fuel cell 120 so power is surplus, the storage controller 115 may cause the energy storage 105 to be charged by as much as the same amount as the amount of surplus power.

Figure 2:
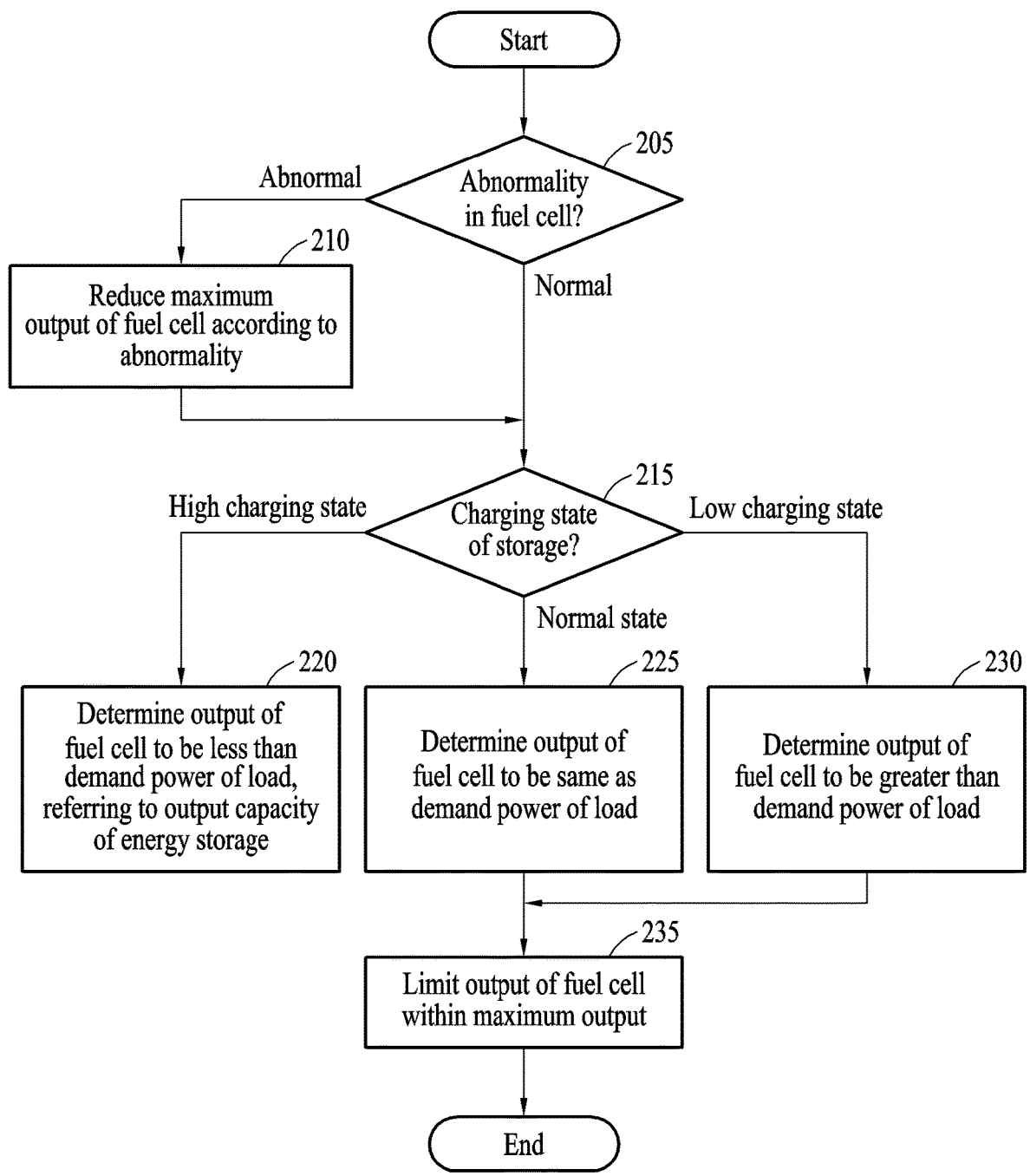
FIG. 2 is a flowchart illustrating a method of controlling an output of a fuel cell of a power supply apparatus according to an example embodiment.

FIG. 2 is a flowchart illustrating a method of controlling an output of a fuel cell of a power supply apparatus, according to an example embodiment.

Referring to FIG. 2, an abnormal state determiner 125 may determine whether there is an abnormality in a fuel cell 120 in operation 205. Where there is an abnormality in the fuel cell 120, the abnormal state determiner 125 may reduce the maximum output of the fuel cell 120 according to the abnormality in operation 210. Where there is no abnormality in the fuel cell 120, the maximum output of the fuel cell 120 may be equal to the output capacity of the fuel cell 120.

In operation 215, a charging state determiner 110 may determine whether a charging state of an energy storage 105 is a high charging state, a normal state, or a low charging state, according to the charging amount of the energy storage 105.

Where the charging state of the energy storage 105 is a high charging state, the fuel cell controller 130 may determine the output of the fuel cell 120 to be less than the demand power of a load 140. For example, where an output capacity of the fuel cell 120 is 20 kW, demand power of the load 140 is 10 kW, an output capacity of the energy storage 105 is 10 kW, and the charging state of the energy storage 105 is the high charging state, the fuel cell controller 130 may determine an output of the fuel cell 120 to be 5 kW to induce discharging of the energy storage 105 according to the high charging state.

In an example embodiment, even where the charging state of the energy storage 105 returns to the normal state from the high charging state through discharging, the fuel cell controller 130 may determine the output of the fuel cell 120 to be less than the demand power of the load 140 until the charging amount reaches a median value in a charging amount range. Accordingly, the charging amount of the energy storage 105 may be sufficiently reduced.

Where the charging state of the energy storage 105 is a normal state, the fuel cell controller 130 may determine, in operation 225, the output of the fuel cell 120 to be equal to the demand power of the load 140.

Where the charging state of the energy storage 105 is a low charging state, the fuel cell controller 130 may determine the output of the fuel cell 120 to be greater than the demand of the load 140, with reference to the output capacity of the energy storage 105. For example, where an output capacity of the fuel cell 120 is 20 kW, demand power of the load 140 is 10 kW, an output capacity of the energy storage 105 is 10 kW, and a charging state of the energy storage 105 is the low charging state, the fuel cell controller 130 may determine an output of the fuel cell 120 to be 15 kW to induce charging of the energy storage 105 according to the low charging state.

In an example embodiment, even where the charging state of the energy storage 105 returns to the normal state from the low charging state through charging, the fuel cell controller 130 may determine the output of the fuel cell 120 to be greater than the demand power of the load 140 until the charging amount reaches a median value in the charging amount range. Accordingly, the charging amount of the energy storage 105 may be sufficiently increased.

In operation 235, the fuel cell controller 130 may determine the output of the fuel cell 120 to be the maximum output where the output of the fuel cell 120 determined in operations 220, 225, and 230 is greater than the maximum output of the fuel cell 120. Where the output of the fuel cell 120 determined in operations 220, 225, and 230 is a negative number, the fuel cell controller 130 may determine the output of the fuel cell 120 to be 0.

Figure 3:
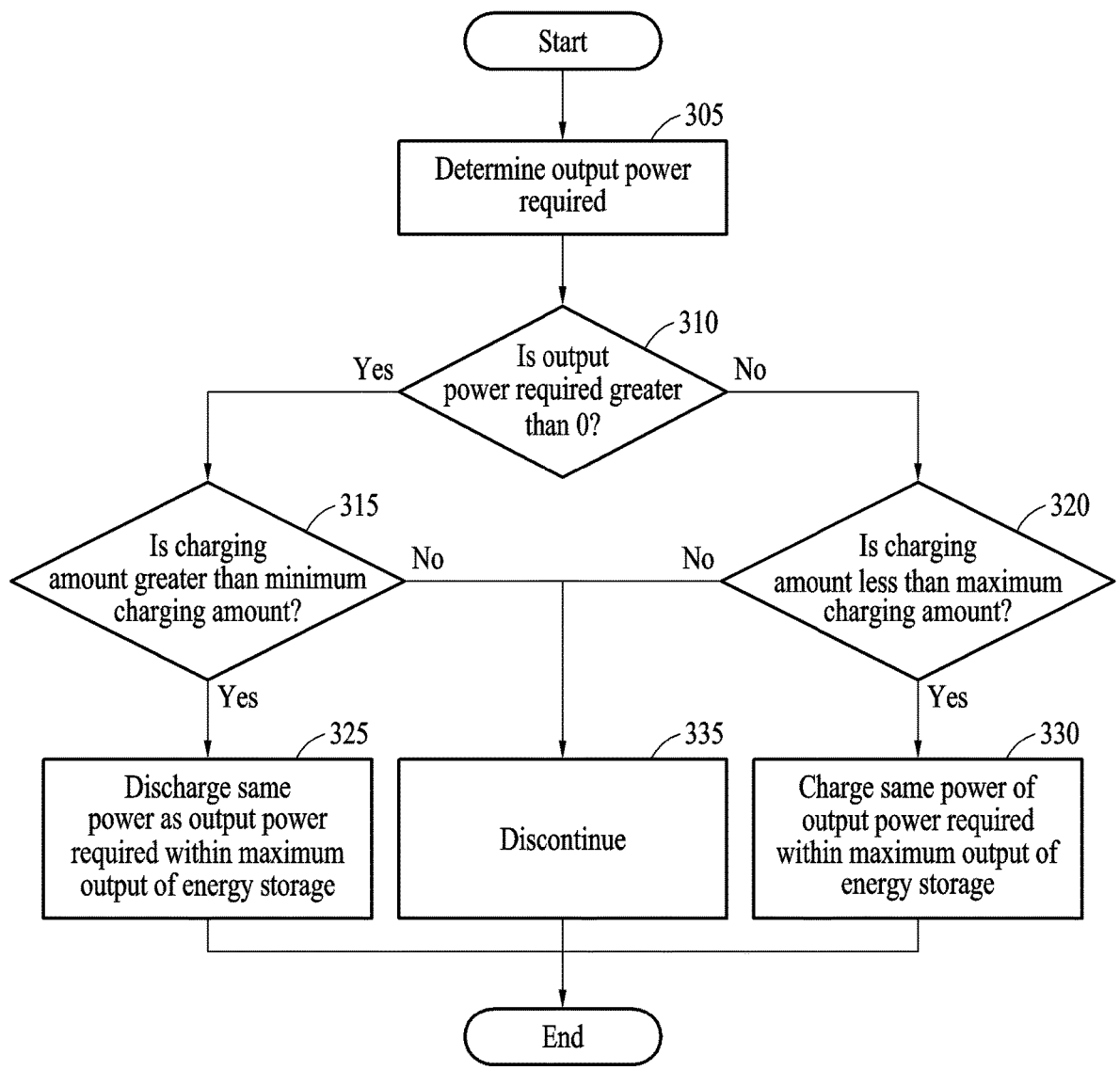
FIG. 3 is a flowchart illustrating a method of controlling charging and discharging of an energy storage of a power supply apparatus, according to an example embodiment.

FIG. 3 is a flowchart illustrating a method of controlling charging and discharging of an energy storage of a power supply apparatus, according to an example embodiment.

Referring to FIG. 3, an output of an energy storage 105 may be determined according to demand power of a load 140 and output power of a fuel cell 120. In operation 305, a storage controller 115 may determine output power required, based on a difference between the demand power of the load 140 and the output power of the fuel cell 120.

In operation 310, the storage controller 115 may determine whether output power required is greater than zero. Where the output power required is greater than 0, discharging of the energy storage 105 may be required, and where the output power required is less than 0, charging of the energy storage 105 may be required. Where the energy storage 105 charges or discharges the same amount of power as the amount of the output power required, the same amount of power as the amount of the demand power of the load 140 may be supplied to the load 140 together with the output of the fuel cell 120.

Where the demand power of the load 140 is greater than the output power of the fuel cell 120 so the output demand power is greater than 0, the storage controller 115 may determine whether the charging amount of the energy storage 105 is greater than the minimum charging amount, in operation 315. Where the charging amount of the energy storage 105 falls below the minimum charging amount, the performance of the energy storage 105 may deteriorate and the storage controller 115 may control the discharging of the energy storage 105 to prevent the charging amount of the energy storage 105 from being less than the minimum charging amount.

For example, where the charging amount of the energy storage 105 is greater than the minimum charging amount, the storage controller 115 may, in operation 325, control the energy storage 105 to discharge the same amount of power as the amount of the output power required within the maximum output of the energy storage 105. Where the charging amount of the energy storage 105 is less than the minimum charging amount, the storage controller 115 may discontinue the discharging of the energy storage 105 in operation 335.

Where the demand power of the load 140 is less than the output power of the fuel cell 120 so that output power required is less than 0, the storage controller 115 may determine whether the charging amount of the energy storage 105 is less than the maximum charging amount in operation 320. Where the charging amount of the energy storage 105 is greater than the maximum charging amount, the performance of the energy storage 105 may deteriorate and the storage controller 115 may control the energy storage 105 to prevent the charging amount of the energy storage 105 from not exceeding the maximum charging amount.

For example, where the charging amount of the energy storage 105 is less than the maximum charging amount, the storage controller 115 may, in operation 330, control the energy storage 105 to charge the same amount of power as the amount of output power required within the maximum output of the energy storage 105. Where the charging amount of the energy storage 105 is greater than the maximum charging amount, the storage controller 115 may discontinue charging the energy storage 105 in operation 335.

Hereinafter, an example of cooperation between a fuel cell 120 and an energy storage 105 is described with reference to FIGS. 4 and 5.

Figure 4:
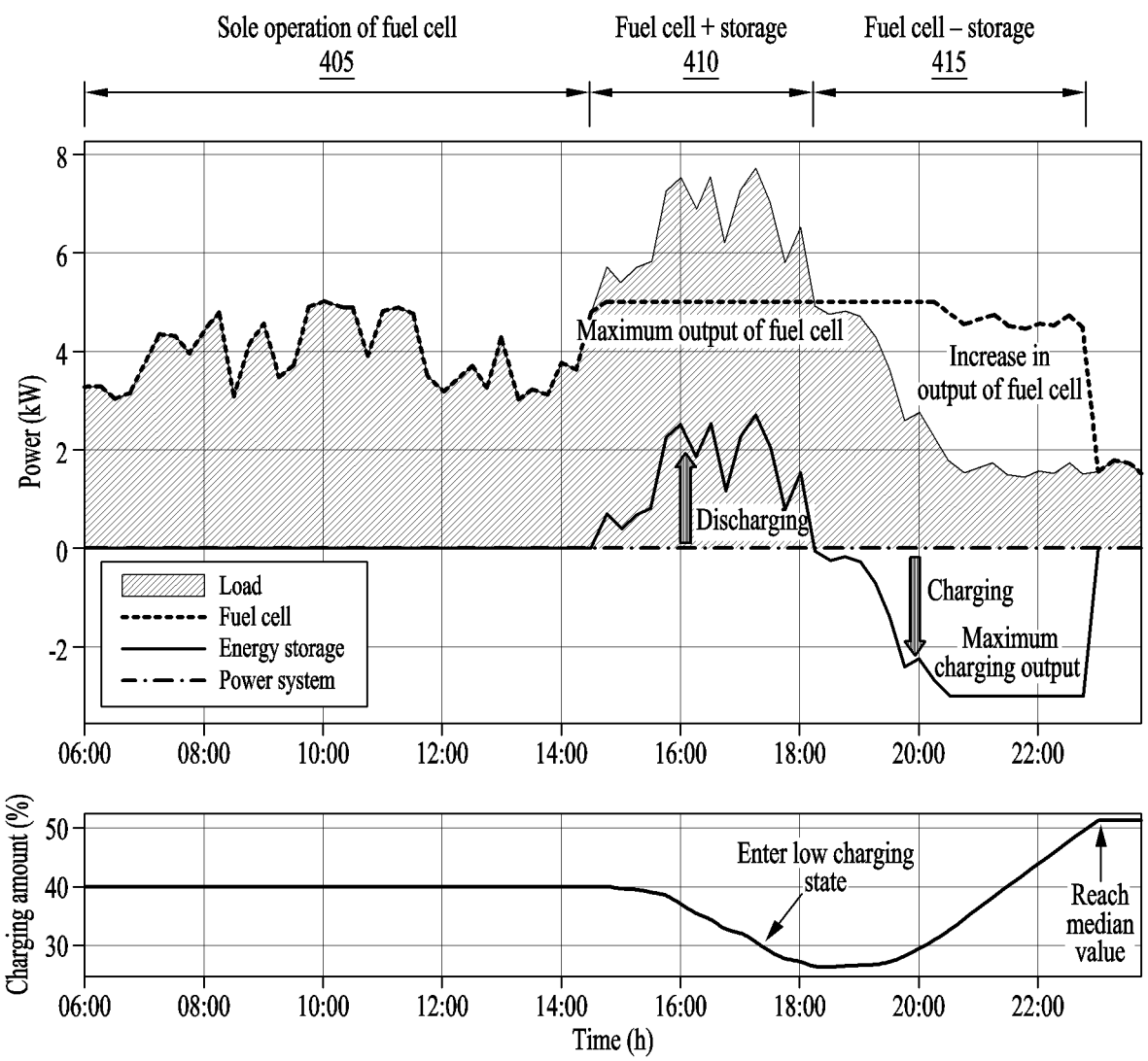
FIG. 4 is a diagram illustrating cooperation of a fuel cell and an energy storage according to an increase in demand power of a load.

FIG. 4 is a diagram illustrating cooperation between a fuel cell and an energy storage according to an increase in demand power of a load.

Referring to FIG. 4, illustrated are: change in power of a load 140, a fuel cell 120, an energy storage 105, and an energy system 135; and change in a charging amount of the energy storage 105, in a day. An output capacity of the fuel cell 120 may be 5 kW, and a maximum charging output and a maximum discharging output of the energy storage 105 may be 3 kW. The fuel cell 120 may be in a normal state, and an abnormal state determiner 125 may determine a maximum output of the fuel cell 120 to be 5 kW, which is equal to the output capacity of the fuel cell 120.

In a first time period 405, the demand power of the load 140 may be supplied solely by the fuel cell 120. The energy storage 105 may have no output in a stationary state, and there may be no change in the charging amount of the energy storage 105. In the first time period 405, demand power of the load 140 may be within 5 kW, which is the maximum output of the fuel cell 120, so the fuel cell 120 may track the demand power of the load 140 to supply power to the load 140.

In a second time period 410, the demand power of the load 140 may rapidly increase and thus exceed the maximum output of the fuel cell 120. The fuel cell 120 may output power at the maximum output, and the energy storage 105 may discharge a short amount of power to the load 140. According to the discharging of the energy storage 105 in the second time period 410, the charging amount of the energy storage 105 may gradually decrease from 40% and thus enter a low charging state.

In a third time period 415, the demand power of the load 140 may be less than the maximum output of the fuel cell 120. Since the energy storage 105 is in a low charging state, the fuel cell controller 130 may maintain the output power of the fuel cell 120 to be greater than the power demand of the load 140. For example, the output power of the fuel cell 120 may be determined by adding 3 kW, which is the maximum charging capacity of the energy storage 105, to the demand power of the load 140. The fuel cell controller 130 may maintain the output power of the fuel cell 120 to be greater than the power demand of the load 140 until the charging amount of the energy storage 105 reaches a median value in a charging amount range.

Since surplus power after being supplied to the load 140 among the output power of the fuel cell 120 while the energy storage 105 is being charged is equal to the maximum charging power of the energy storage 105, the energy storage 105 may be charged with the maximum charging power and there may be no power transmitted to a power system 135.

Figure 5:
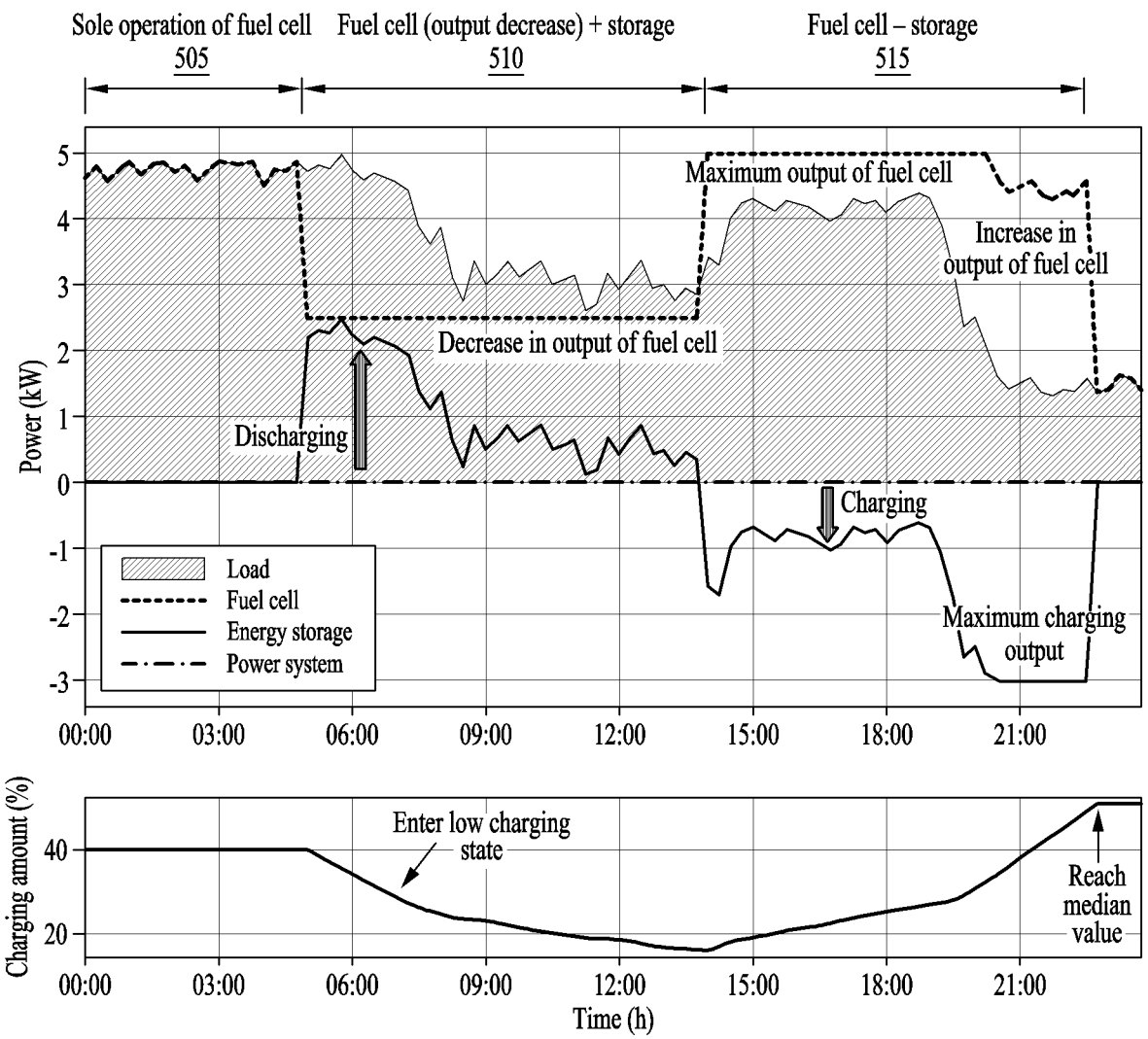
FIG. 5 is a diagram illustrating cooperation with an energy storage according to an abnormal state of a fuel cell.

FIG. 5 is a diagram illustrating cooperation with an energy storage according to an abnormal state of a fuel cell.

Referring to FIG. 5, illustrated are change in power of a load 140, a fuel cell 120, an energy storage 105, and a power system 135 and change in a charging amount of the energy storage 105, in a day. An output capacity of the fuel cell 120 may be 5 kW, and a maximum charging output and a maximum discharging output of the energy storage 105 may be 3 kW.

In a first time period 505, the fuel cell 120 may be in a normal state and an abnormal state determiner 125 may determine a maximum output of the fuel cell 120 to be 5 kW, which is equal to the output capacity of the fuel cell 120. The demand power of the load 140 may be supplied solely by the fuel cell 120. The energy storage 105 may have no output in a stationary state, and there may be no change in the charging amount. In the first time period 505, the demand power of the load 140 may be within 5 kW, which is the maximum output of the fuel cell 120, so that the fuel cell 120 may track the demand power of the load 140 to supply power to the load 140.

In a second time period 510, there may be an abnormality in the fuel cell 120. The abnormal state determiner 125 may detect an abnormality in the fuel cell 120 and reduce the maximum output of the fuel cell 120 to 2.5 kW. As the maximum output of the fuel cell 120 is reduced to less than or equal to the demand power of the load 140, insufficient demand power may be supplied by the energy storage 105. As the energy storage 105 discharges power, the charging amount of the energy storage 105 may decrease and thus enter a low charging state. In order to induce the charging of the energy storage 105, the amount of power greater than the amount of demand power of the load 140 may need to be output. However, the maximum output of the fuel cell 120 may be limited, so that the charging amount of the energy storage 105 may continuously reduce.

In an example embodiment, the decreasing amount of the maximum output according to the occurrence of an abnormality in the fuel cell 120 may vary depending on the type of abnormality. Where fuel is insufficient, the decreasing amount of the maximum output of the fuel cell 120 may be determined according to a degree of fuel shortage and an operable time, and where a fuel shortage is resolved, the maximum output may increase again. Where the fuel cell 120 is overheated, the decreasing amount of the maximum output may continuously vary according to a temperature change, and where there is a failure in the fuel cell 120, an operation of the fuel cell 120 may be discontinued. An abnormality in the fuel cell 120 and a decrease in the maximum output are described below with reference to FIG. 6.

In a third time period 515, the abnormal state determiner 125 may set the maximum output of the fuel cell 120 to be equal to the output capacity of the fuel cell 120 again since the abnormality of the fuel cell 120 is resolved. Since the charging state of the energy storage 105 is the low charging state in the third time period 515, the output of the fuel cell 120 may be determined to be greater than the demand power of the load 140. The output of the fuel cell 120 may be determined by adding 3 kW, which is the maximum charging output of the energy storage 105, to the demand power of the load 140. However, where 3 kW is added to the demand power of the load 140, the output of the fuel cell 120 may exceed the maximum output of the fuel cell 120 and thus be determined to be 5 kW. Surplus power after being supplied to the load 140 among the output of the fuel cell 120 may be transferred to the energy storage 105 so as to charge the energy storage 105. The charging of the energy storage 105 may continue until the charging amount of the energy storage 105 reaches a median value of the charging amount range.

Hereinafter, a maximum output limited according to an abnormality of the fuel cell 120 is described with reference to FIG. 6.

Figure 6:
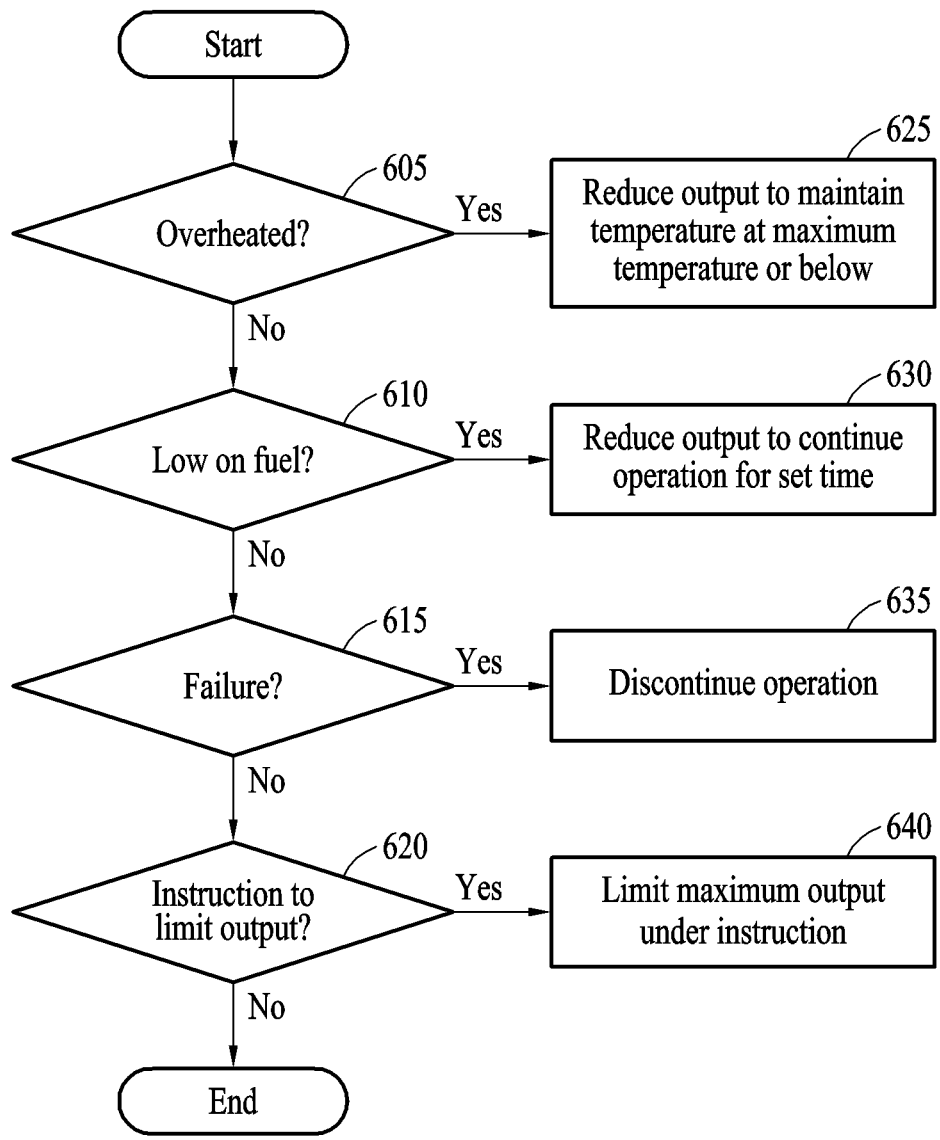
FIG. 6 is a flowchart illustrating a method of controlling a maximum output of a fuel cell when an abnormality occurs in the fuel cell, according to an example embodiment.

Referring to FIG. 6, types of abnormalities of a fuel cell 120 may include an overheating, a fuel shortage, a failure, and an instruction to limit an output. However, the types stated above are only examples, and the types of abnormalities of the fuel cell 120 may not be limited thereto. Operations 605, 610, 615, 620, 625, 630, 635, and 640 of FIG. 6 may be included in operations 205 and 210 of FIG. 2.

In operation 605, an abnormal state determiner 125 may determine whether the fuel cell 120 is overheated. Where the fuel cell 120 is overheated, power generation of the fuel cell 120 may need to be limited to lower the temperature of the fuel cell 120. In operation 625, the abnormal state determiner 125 may reduce the maximum output of the fuel cell 120, so that the temperature of the fuel cell 120 is maintained at or under or reduced to a set maximum temperature. In an example embodiment, the abnormal state determiner 125 may continuously change the maximum output of the fuel cell 120 to trace the temperature of the fuel cell 120.

Where the fuel cell 120 is not overheated, the abnormal state determiner 125 may determine whether the fuel cell 120 is low on fuel in operation 610. Where the fuel is insufficient, the abnormal state determiner 125 may reduce the maximum output of the fuel cell 120 in operation 630 so that an operation of the fuel cell 120 may continue for a set time. For example, where remaining fuel is 100 and the fuel is used by 50 per hour at the maximum output, the fuel cell 120 may operate for 2 hours, but where the fuel cell 120 needs to be operative for 4 hours, the maximum output may reduce so that the fuel may be used by 25 per hour.

Where the fuel cell 120 is not low on fuel, the abnormal state determiner 125 may, in operation 615, determine whether there is a failure in the fuel cell 120. Where a failure occurs in the fuel cell 120, the abnormal state determiner 125 may discontinue the operation of the fuel cell 120 in operation 635. For example, in the case of a minor failure that does not affect the output of the fuel cell 120, the maximum output and the operation of the fuel cell 120 may not be limited. However, in the case of a safety accident or a failure that affects the operation of the fuel cell 120, the operation of the fuel cell 120 may be immediately discontinued.

Where a failure does not occur in the fuel cell 120, the abnormal state determiner 125 may determine whether there is an instruction from an operator of a power supply apparatus 100 to limit an output in operation 620. Where there is an instruction to limit the output, the abnormal state determiner 125 may reduce the maximum output of the fuel cell 120 according to the instruction to limit the output in operation 640.

The example of FIG. 6 illustrates as if there is a priority in determining whether each type of abnormality occurs as shown in operations 605, 610, 615, and 620. However, such types may be examples and whether each type of abnormality occurs may be determined in parallel without priority or occurrence of an abnormality may be determined with a priority different from the priority shown in the example of FIG. 6.

Figure 7:
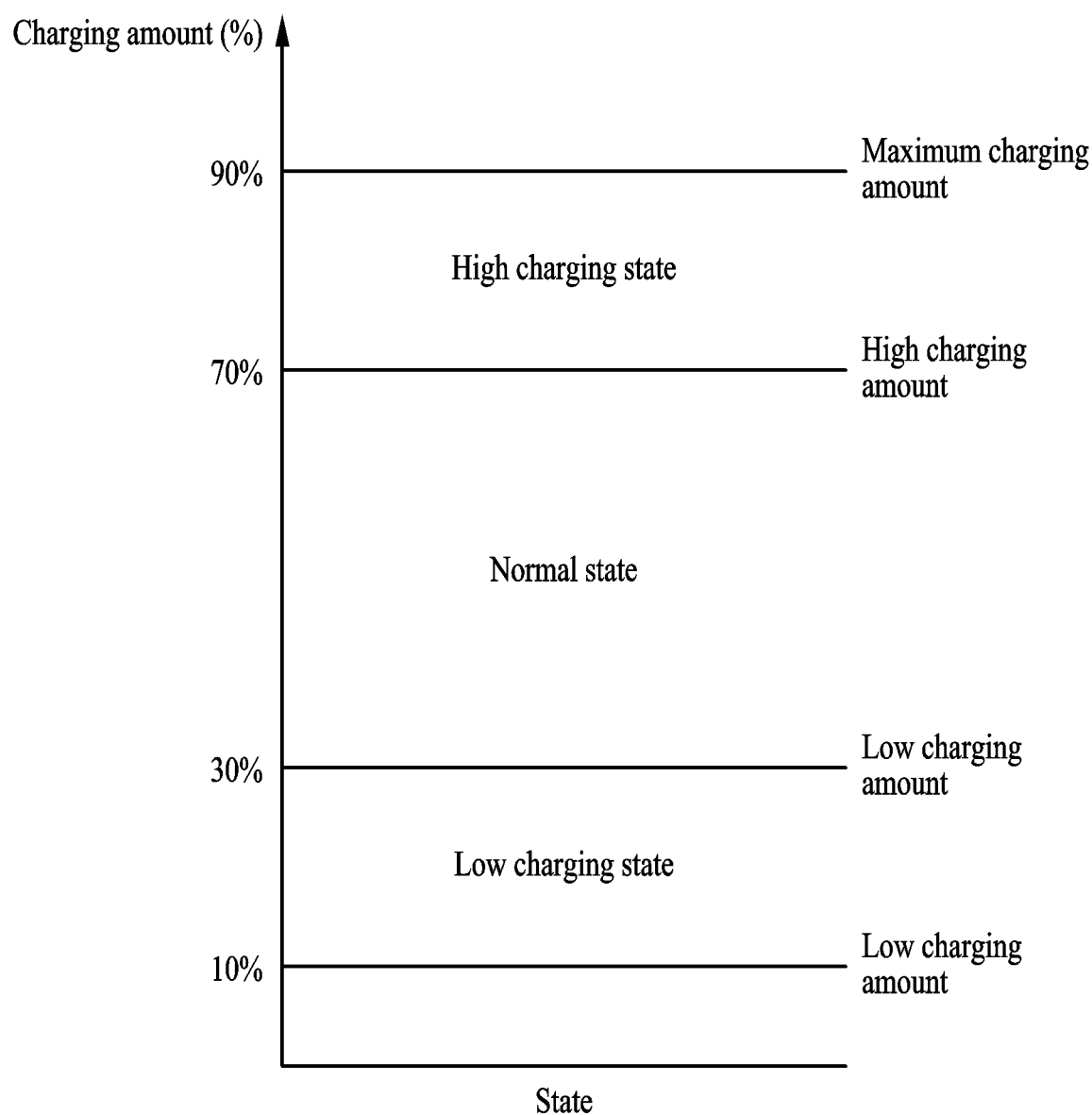
FIG. 7 is a diagram illustrating a charging state determined according to a charging amount of an energy storage, according to an example embodiment.

FIG. 7 is a diagram illustrating a charging state determined according to a charging amount of an energy storage according to an example embodiment.

Referring to FIG. 7, illustrated is a criterion for classifying a charging state of an energy storage 105 according to a charging amount of the energy storage 105.

The criterion for classifying the charging state may include a maximum charging amount, a high charging amount, a low charging amount, and a minimum charging amount. The maximum charging amount may refer to 90%, the high charging amount to 70%, the low charging amount to 30%, and the minimum charging amount to 10%. Values of the charging amount for each criterion are only examples and may be variously set as necessary.

A charging amount range in which the energy storage 105 may be charged and discharged may be less than or equal to the maximum charging amount and greater than or equal to the minimum charging amount. Where the charging amount is less than the maximum charging amount and greater than the high charging amount, the charging amount may be in the high charging state, and where the charging amount is less than the high charging amount and greater than the low charging amount, the charging amount may be in the normal state, and where the charging amount is less than the low charging amount and greater than the minimum charging amount, the charging amount may be in the low charging state.

The energy storage 105 may be induced to discharge power through cooperation between the fuel cell controller 130 and the storage controller 115 in the high charging state and may be induced to be charged through cooperation between the fuel cell controller 130 and the storage controller 115 in the low charging state. In the normal state, neither charging nor discharging of the energy storage 105 may be induced.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The examples described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, other implementations, other examples, and equivalents to the claims are also within the scope of the following claims.

What is claimed is:

1. A power supply apparatus comprising:
a fuel cell configured to generate power, using fuel;
an abnormal state determiner configured to determine whether there is an abnormality in the fuel cell and to adjust a maximum output of the fuel cell based on the determination, wherein the abnormality includes overheating, fuel shortage, failure without fuel shortage, and instruction to limit an output of the fuel cell;
a fuel cell controller configured to control output power of the fuel cell within the maximum output based on demand power of a load;
an energy storage configured to charge with power by receiving the power from the fuel cell and supply the power to the load;
a charging state determiner configured to determine a charging state of the energy storage based on a charging amount of the energy storage; and
a storage controller configured to control charging and discharging of the energy storage based on a difference between the demand power of the load and the output power of the fuel cell.

2. The power supply apparatus of claim 1, wherein the fuel cell controller is configured to determine an output of the fuel cell to be equal to the demand power of the load, where the charging state of the energy storage is a normal state.

3. The power supply apparatus of claim 1, wherein the fuel cell controller is configured to determine an output of the fuel cell to be less than the demand power of the load, where the charging state of the energy storage is a high charging state.

4. The power supply apparatus of claim 1, wherein the fuel cell controller is configured to determine an output of the fuel cell to be greater than the demand power of the load, where the charging state of the energy storage is in a low charging state.

5. The power supply apparatus of claim 1, wherein the storage controller is configured to:
determine output power required, based on a difference between the demand power of the load and the output power of the fuel cell;
control the energy storage to discharge a same power as the output power required within a maximum output of the energy storage, where the demand power of the fuel cell and the charging amount is greater than a set minimum charging amount; and
control the energy storage to charge with a same power as the output power required within the maximum output of the energy storage, where the demand power of the load is less than the output power of the fuel cell and the charging amount is less than a set maximum charging amount.

6. The power supply apparatus of claim 5, wherein the storage controller is configured to:
discontinue discharging the energy storage, where the demand power of the load is greater than the output power of the fuel cell and the charging amount is less than the set minimum charging amount; and
discontinue charging the energy storage, where the demand power of the load is less than the output power of the fuel cell and the charging amount is greater than the set maximum charging amount.

7. The power supply apparatus of claim 1, wherein the abnormal state determiner is configured to determine whether the fuel cell is overheated and, where overheated, reduce the maximum output of the fuel cell such that a temperature of the fuel cell is maintained at a maximum temperature or below.

8. The power supply apparatus of claim 1, wherein the abnormal state determiner is configured to determine whether the fuel cell is low on fuel and, where the fuel cell is low on fuel, reduce the maximum output of the fuel cell such that the fuel cell is operative for a set time.

9. The power supply apparatus of claim 1, wherein the abnormal state determiner is configured to determine whether a failure occurs in the fuel cell when there is no fuel shortage and, where the failure occurs, discontinue an operation of the fuel cell.

10. The power supply apparatus of claim 1, wherein the abnormal state determiner is configured to determine whether there is an instruction from an operator to limit an output, and, where there is the instruction to limit the output, reduce the maximum output of the fuel cell according to the instruction to limit the output.

11. A method of supplying power, the method comprising:
generating power, using a fuel cell;
determining whether there is an abnormality in the fuel cell and adjusting a maximum output of the fuel cell based on the determination, wherein the abnormality includes overheating, fuel shortage, failure without fuel shortage, and instruction to limit an output of the fuel cell;
controlling output power of the fuel cell within the maximum output, based on demand power of a load;
determining a charging state of an energy storage based on a charging amount of the energy storage configured to be charged by receiving power from the fuel cell and supply power to the load; and
controlling charging and discharging of the energy storage based on a difference between the demand power of the load and the output power of the fuel cell.

12. The method of claim 11, wherein the controlling of the output power of the fuel cell comprises determining an output of the fuel cell to be equal to the demand power of the load, where the charging state of the energy storage is a normal state.

13. The method of claim 11, wherein the controlling of the output power of the fuel cell comprises determining an output of the fuel cell to be less than the demand power of the load, where the charging state of the energy storage is a high charging state.

14. The method of claim 11, wherein the controlling of the output power of the fuel cell comprises determining an output of the fuel cell to be greater than the demand power of the load, where the charging state of the energy storage is a low charging state.

15. The method of claim 11, wherein the controlling of the charging and the discharging of the energy storage comprises:
   determining output power required, based on a difference between the demand power of the load and the output power of the fuel cell;
   controlling the energy storage to discharge a same power as the output power required within a maximum output of the energy storage, where the demand power of the load is greater than the output power of the fuel cell and the charging amount is greater than a set minimum charging amount; and
   controlling the energy storage to charge with a same power as the output power required within the maximum output of the energy storage, where the demand power of the load is less than the output power of the fuel cell and the charging amount is less than a set maximum charging amount.

16. The method of claim 15, wherein the controlling of the charging and the discharging of the energy storage further comprises:
   discontinuing discharging of the energy storage, where the demand power of the load is greater than the output power of the fuel cell and the charging amount is less than the set minimum charging amount; and
   discontinuing charging of the energy storage, where the demand power of the load is less than the output power of the fuel cell and the charging amount is greater than the set maximum charging amount.

17. The method of claim 11, wherein the determining of the maximum output of the fuel cell comprises:
   determining whether the fuel cell is overheated; and
   where the fuel cell is overheated, reducing the maximum output of the fuel cell so that a temperature of the fuel cell is maintained at a maximum temperature of the fuel cell or below.

18. The method of claim 11, wherein the determining of the maximum output of the fuel cell comprises:
   determining whether the fuel cell is low on fuel; and
   where the fuel cell is low on fuel, reducing the maximum output of the fuel cell to operate the fuel cell for a set time.

19. The method of claim 11, wherein the determining of the maximum output of the fuel cell comprises:
   determining whether a failure occurs in the fuel cell when there is no fuel shortage; and
   where the failure occurs, discontinuing an operation of the fuel cell.

20. The method of claim 11, wherein the determining of the maximum output of the fuel cell comprises:
   determining whether there is an instruction from an operator to limit an output; and
   where there is the instruction to limit the output, reducing the maximum output of the fuel cell according to the instruction to limit the output.

* * * * *